(12) United States Patent
Wang et al.

(10) Patent No.: US 11,442,757 B2
(45) Date of Patent: Sep. 13, 2022

(54) SIMULATION METHOD AND SIMULATION SYSTEM

(71) Applicant: Shanghai Zhaoxin Semiconductor Co., Ltd., Shanghai (CN)

(72) Inventors: Junshi Wang, Beijing (CN); Meng Wang, Beijing (CN); Zheng Wang, Beijing (CN)

(73) Assignee: Shanghai Zhaoxin Semiconductor Co., Ltd., Shanghai (CN)

(*) Notice: Subject to any disclaimer, the term of this patent is extended or adjusted under 35 U.S.C. 154(b) by 65 days.

(21) Appl. No.: 17/079,530

(22) Filed: Oct. 26, 2020

(65) Prior Publication Data

US 2021/0247991 A1  Aug. 12, 2021

(30) Foreign Application Priority Data

Feb. 10, 2020  (CN) .......................... 202010084241.4

(51) Int. Cl.
  *G06F 9/48*  (2006.01)
  *G06F 9/30*  (2018.01)
  (Continued)

(52) U.S. Cl.
  CPC ...... *G06F 9/45508* (2013.01); *G06F 9/30047* (2013.01); *G06F 9/30167* (2013.01);
  (Continued)

(58) Field of Classification Search
  CPC ............. G06F 9/45508; G06F 9/30047; G06F 9/3804; G06F 9/3842; G06F 9/3867;
  (Continued)

(56) References Cited

U.S. PATENT DOCUMENTS

| 7,047,394 B1* | 5/2006 | Van Dyke | G06F 9/30123 |
| | | | 712/E9.035 |
| 2010/0057427 A1* | 3/2010 | Walker | G06F 9/3844 |
| | | | 703/17 |

OTHER PUBLICATIONS

Derek Chiou et al., FPGA-Accelerated Simulation Technologies (FAST): Fast, Full-System, Cycle-Accurate Simulators, 2007 IEEE, [Retrieved on Dec. 16, 2021]. Retrieved from the internet: <URL: https://ieeexplore.ieee.org/stamp/stamp.jsp?tp=&arnumber=4408260> 13 Pages (249-261) (Year: 2007).*

(Continued)

*Primary Examiner* — Anibal Rivera
(74) *Attorney, Agent, or Firm* — JCIPRNET

(57) ABSTRACT

A simulation method and a simulation system are provided. The simulation system may be divided into an execution model and a processor model based on a JIT emulation engine. The execution model can call the JIT emulation engine to execute instructions, and obtain influence of instructions on a processor architectural status. The processor model may simulate an internal process of a target processor and determine whether to start/end a speculation. The execution model and the processor model may interact through a specific protocol. After the speculation is started, the simulation method may store an application running scene when the speculation is started, and redirect influence of speculation instructions on a memory to a memory snapshot. After the speculation is ended, the simulation method may also restore the application running scene to a status before the speculation is started, and cancel influence of the speculation instructions on the memory.

30 Claims, 6 Drawing Sheets

(51) Int. Cl.
    *G06F 9/38* (2018.01)
    *G06F 9/455* (2018.01)
    *G06F 9/46* (2006.01)
(52) U.S. Cl.
    CPC .......... *G06F 9/3804* (2013.01); *G06F 9/3842* (2013.01); *G06F 9/3867* (2013.01); *G06F 9/4552* (2013.01); *G06F 9/461* (2013.01); *G06F 9/30123* (2013.01); *G06F 9/30174* (2013.01); *G06F 9/30189* (2013.01); *G06F 9/30196* (2013.01); *G06F 9/3844* (2013.01); *G06F 9/45533* (2013.01); *G06F 9/45554* (2013.01); *G06F 9/45558* (2013.01)
(58) Field of Classification Search
    CPC ...... G06F 9/4552; G06F 9/461; G06F 9/3844; G06F 9/30189; G06F 9/45533; G06F 9/30196; G06F 9/45554; G06F 9/45558; G06F 9/30174; G06F 9/30167; G06F 9/30101; G06F 9/30149; G06F 9/3851; G06F 9/3861; G06F 9/3802; G06F 9/3005; G06F 9/30123
    See application file for complete search history.

(56) References Cited

OTHER PUBLICATIONS

Pablo Montesinos Ortego, SESC: SuperESCalar Simulator, Dec. 20, 2004, [Retrieved on Dec. 20, 2022]. Retrieved from the internet: <URL: https://citeseerx.ist.psu.edu/viewdoc/download?doi=10.1.1.162.2439&rep=rep1&type=pdf> 22 Pages (1-22) (Year: 2004).*

Martin Schoeberl, A Time-predictable Branch Predictor, Apr. 8-12, 2019, [Retrieved on Dec. 20, 2022]. Retrieved from the internet: <URL: https://dl.acm.org/doi/pdf/10.1145/3297280.3297337> 10 Pages (607-616) (Year: 2019).*

* cited by examiner

SIMULATION METHOD AND SIMULATION SYSTEM

CROSS-REFERENCE TO RELATED APPLICATION

This application claims the priority benefit of China application no. 202010084241.4, filed on Feb. 10, 2020. The entirety of the above-mentioned patent application is hereby incorporated by reference herein and made a part of this specification.

TECHNICAL FIELD

The invention relates to a central processing unit (CPU) modeling technology, and more particularly, relates to a simulation method and a simulation system based on a just-in-time (JIT) emulation engine.

BACKGROUND

In the current CPU design, speculative execution is a very important technical means to improve message execution efficiency. A typical representative is the prediction of branch instructions. The CPU predicts directions and target addresses of the branch instructions to be executed in the future by collecting a jump history of the branch instructions. If the prediction is correct, an instruction throughput of the CPU can be significantly improved. By modeling and simulating speculative execution behavior, the number of speculation occurrences in the CPU architecture and the impact of speculative execution on CPU performance can be optimized, providing a reference for CPU hardware design.

In addition to algorithm design and hardware design, software design is also very important to optimize the speculative performance of the CPU. The branch instruction distribution conforming to the prediction algorithm can achieve very considerable prediction efficiency.

In the process of software performance analysis and tuning, the static analysis method cannot obtain the best analysis results. Executing the software directly on the hardware is difficult to achieve accurate quantitative analysis due to the limitations of the debugging means (e.g., a performance counter) provided by the hardware platform. By using the emulation dynamic analysis through the simulating execution, the actual performance bottlenecks in the software may be found more easily.

JIT emulation engine is a very effective CPU modeling and emulation technology, and the secondary development cost is relatively small. Its main feature is that by instrumenting and converting the assembly of a to-be-run application, the to-be-run application is converted into a code that can be run directly on a physical machine and can obtain a running environment of the application, which may then be directly run on the physical machine. The status the JIT emulation engine obtains before and after the instruction execution does not come from the virtual environment maintained by the JIT emulation engine itself, but from the actual environment in which a processor runs.

The JIT emulation engine does not need a huge number of instruction decoding and execution units, but the instruction decoding and executing is performed by a physical machine instead to provide very fast emulation speed. At the same time, developing a emulator based on the JIT emulation engine can well divide the modules. After the development of each module is completed, the complete application can be run with the support of the JIT emulation engine to well avoid the problem of excessive one-time development tasks.

However, the shortcoming of the JIT emulation engine is that the JIT emulation engine shields internal implementation details of the CPU and can only output the CPU's architectural status information, including registers and memories. Therefore, the JIT emulation engine needs to be used in conjunction with the CPU model. The JIT emulation engine provides the results of instruction execution while the CPU model provides the internal details of the CPU operation. However, the instructions executed by the JIT emulation engine will modify the application execution environment and cannot be undone. This limits the JIT emulation engine's ability to model the speculative execution. None of the currently popular emulators based on the JIT emulation engine can support speculative execution and could only execute instructions on the correct instruction stream. A more accurate emulator can reflect the impact of speculative execution on instruction latency and throughput by increasing the penalty, but cannot reflect the impact of speculative execution on the internal state of the CPU such as branch prediction tables and caches.

SUMMARY

The invention provides a simulation method adapted to a simulation system including an execution model and a processor model. The method includes: simulating a target processor by the processor model to generate a plurality of first branch prediction information associated with a first branch instruction; receiving a first fetch start message from the processor model by the execution model, wherein the first fetch start message comprises a first fetch address; calling a real-time emulation engine by the execution model to control a physical machine to fetch and execute the first branch instruction according to the first fetch address; obtaining a plurality of first branch instruction information of the first branch instruction from the real-time emulation engine and providing the plurality of first branch instruction information to the processor model by the execution model; and in response to determining that the plurality of first branch prediction information do not exactly match the plurality of first branch instruction information, recording a first processor status of the physical machine and enforcing the real-time emulation engine to execute a first speculation operation according to the plurality of first branch prediction information by the execution model.

The invention provides a simulation system, which includes an execution model and a processor model. The processor model simulates a target processor to generate a plurality of first branch prediction information associated with a first branch instruction. The execution model receives a first fetch start message from the processor model, wherein the first fetch start message comprises a first fetch address. The execution model calls a real-time emulation engine to control a physical machine to fetch and execute the first branch instruction according to the first fetch address. The execution model obtains a plurality of first branch instruction information of the first branch instruction from the real-time emulation engine and provides the plurality of first branch instruction information to the processor model. In response to determining that the plurality of first branch prediction information do not exactly match the plurality of first branch instruction information, the execution model records a first processor status of the physical machine and enforces the real-time emulation engine to execute a first speculation operation according to the plurality of first branch prediction information.

The simulation method and simulation system based on JIT proposed by the invention have the ability to model and simulate speculative execution. Through the simulation method and the simulation system provided by the invention, an emulator based on a JIT emulation engine can also simulate the process of speculation. In general, after a speculation is started, the JIT emulation engine can execute instructions on a speculation operation path and obtain influence of a speculation instruction on an architectural status environment later. After the speculation is ended, the JIT emulation engine can adjust the architectural status to a status before the speculation is started, and begin to execute the instructions on the correct path.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

For allowing the JIT emulation engine to have the ability to model and emulate the speculative execution, the invention proposes a simulation method and a simulation system based on JIT that can support speculative execution. Through the simulation method and the simulation system provided by the invention, an emulator based on the JIT emulation engine is also able to simulate the process of speculation. In general, after a speculation is started, the JIT emulation engine can execute instructions on a speculation operation path and obtain influence of a speculation instruction on an architectural status environment later. After the speculation is ended, the JIT emulation engine can adjust the architectural status to a status before the speculation is started, and begin to execute the instructions on the correct path.

Figure 1:
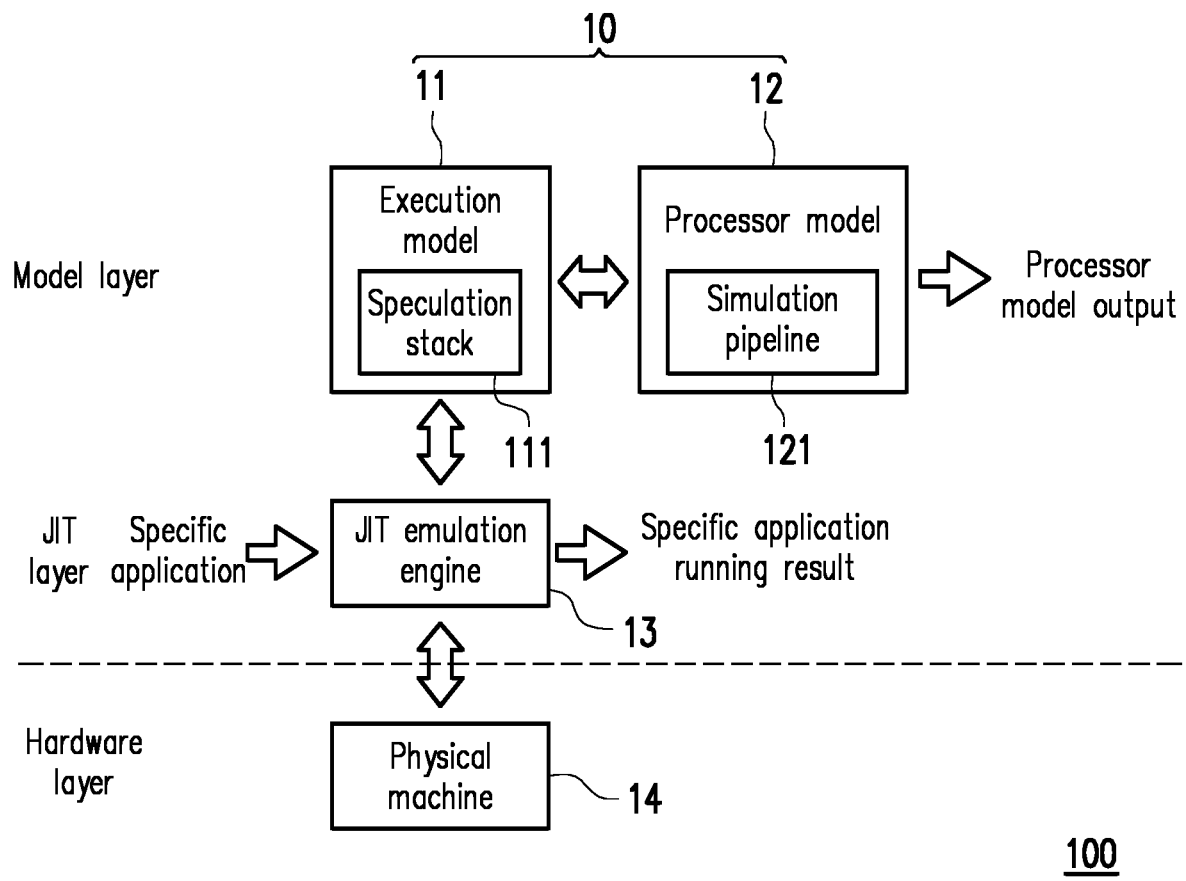
FIG. 1 is a system architecture diagram illustrated according to an embodiment of the invention.

Referring to FIG. 1, FIG. 1 is a system architecture diagram illustrated according to an embodiment of the invention. As shown in FIG. 1, a system 100 of the invention includes a simulation system 10, a JIT emulation engine 13 and a physical machine 14, wherein the simulation system 10 includes an execution model 11 and a processor model 12. In the embodiments of the invention, the execution model 11 and the processor model 12 are, for example, two threads. The execution model 11 may be used to call the JIT emulation engine 13 so that the JIT emulation engine 13 running a specific application can control the physical machine 14 (which is, for example, a computer device including a processor (e.g., CPU)) and obtain influence of instructions on a processor architecture status (e.g., how registers and/or memories are modified). The processor model 12 may be used to simulate an internal running way of a target processor (e.g., CPU), so as to realize functions such as branch prediction, instruction execution by a simulation pipeline 121 and an instruction stream execution control. It is worth noting that the target processor can be a processor of any specific architecture and model (e.g., its architecture can be X86 architecture, ARM architecture and the like), and can simulate any processors, including but limited to: the target processor that needs to optimize its own hardware design, or the target processor that needs to optimize software for its existing hardware design (e.g., performance analysis and fine-tuning for the software running on the target processor).

From the perspective of the execution model 11, the JIT emulation engine 13 may be considered as one processor exclusive to the execution model 11. Further, although the JIT emulation engine 13, the execution model 11 and the processor model 12 are all running on the physical machine 14, the JIT emulation engine 13 hides an actual state of the physical machine 14, and only provides a CPU status caused by the specific application running on the JIT emulation engine 13 to the execution model 11. In addition, in the embodiment of the invention, the JIT emulation engine 13 may provide a result of running the specific application after the emulation operation is ended. The processor model 12 may provide results related to the processor structure, such as the number of instructions executed, the accuracy of branch prediction, the times of speculations and the like, but not limited thereto.

In the embodiments of the invention, the execution model 11 and the processor model 12 may be configured to cooperatively execute the simulation method proposed by the invention, which is described in detail as follows.

Figure 2:
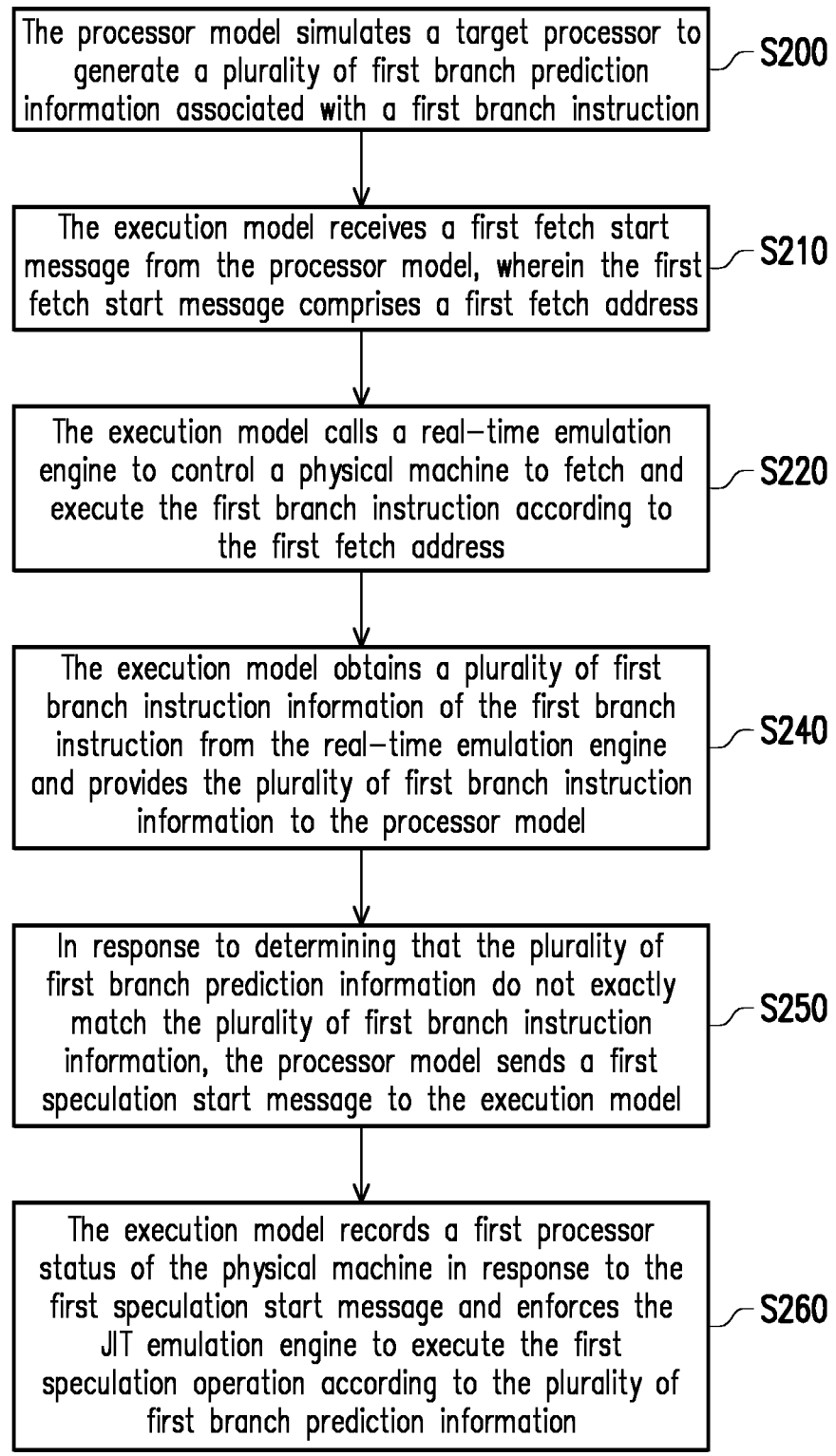
FIG. 2 is a flowchart of a simulation method illustrated according to an embodiment of the invention.

Referring to FIG. 2, FIG. 2 is a flowchart of a simulation method illustrated according to an embodiment of the invention. The method of the present embodiment may be executed by the execution model 11 and the processor model 12 of FIG. 1. The details of each step in FIG. 2 are described below with reference to the content shown in FIG. 1.

First of all, in step S200, the processor model 12 simulates a target processor to generate a plurality of first branch prediction information associated with a first branch instruction. In a different embodiment, if the first branch instruction belongs to one of "jump", "call", "return" and "conditional jump", the first branch instruction may be regarded as a branch instruction, but not limited thereto. In an embodiment, the first branch prediction information may include a first branch instruction prediction address, a first branch prediction direction, a first branch prediction target address and a predicted branch instruction length, but not limited thereto. Among them, "the first branch instruction prediction address" refers to an address of the branch instruction itself ("jump" is taken herein as an example herein); "the first branch prediction direction" refers to a jump direction of the first branch instruction (e.g., a branch taken or a branch not-taken) predicted by a branch prediction module in the processor model 12; "the first branch prediction target address" refers a target address to which the first branch instruction intends to jump, as predicted by the branch prediction module in the processor model 12.

In one embodiment, for a processor in the physical machine 14 and the processor model 12 simulating the target processor, instruction data with a size of 16 bytes may be fetched from a memory in one CPU cycle and these instruction data can be collectively referred to as one fetch unit. Accordingly, in step S200, the processor model 12 may also perform a simulated branch prediction function on a fetch unit (hereinafter, also referred to as a first fetch unit) in advance to generate branch prediction results (e.g., including the above mentioned first branch prediction information) for each branch instruction in the first fetch unit, but the invention is not limited thereto.

Then, in step S210, the execution model 11 may receive a first fetch start message from the processor model 12, wherein the first fetch start message may include a first fetch address. In a different embodiment, the first fetch start message may also include an emulation time. In an embodiment corresponding to step S200, the first fetch address is a starting fetch address of the first fetch unit.

Then, in step S220, the execution model 11 may calls the JIT emulation engine 13 to control the physical machine 14 to fetch and execute the first branch instruction according to the first fetch address. In the embodiments of the invention, details regarding how the physical machine 14 fetches and executes the first branch instruction may refer to the existing methods for the CPU to fetch and execute instructions, ad thus details regarding the same is not repeated herein.

Next, in step S240, the execution model 11 may obtain a plurality of first branch instruction information of the first branch instruction from the JIT emulation engine 13 and provide the plurality of first branch instruction information to the processor model 12. In an embodiment, after the first branch instruction is executed by the JIT emulation engine 13, the execution model 11 may obtain the first branch instruction information related to the first branch instruction executed by the JIT emulation engine 13. In a different embodiment, the first branch instruction information may include static instruction information and dynamic instruction information (e.g., operand values and the like). Here, the static instruction information may include a first branch instruction address, a first branch direction and a first branch target address which are associated with the first branch instruction, but not limited thereto.

In an embodiment, the first branch instruction address, the first branch direction and the first branch target address can be understood as a branch instruction address, a branch direction and a branch target address correctly obtained when the first branch instruction is actually fetched and executed. Upon comparison, the first branch instruction prediction address (e.g., the address of the branch instruction), the first branch prediction direction (e.g., the branch taken or the branch not-taken) and the first branch prediction target address (i.e., the address to which the branch instruction intends to jump) in the first branch prediction information can be understood as prediction results obtained by the processor model 12 through simulation. In an embodiment, if a certain branch is not predicted by the processor model 12, it means that the processor model 12 predicts that the instruction is the branch not-taken. That is to say, the address jump will not occur at that first branch instruction, but an instruction subsequent to the first branch instruction will be executed instead.

In an embodiment, the processor model 12 may determine whether the first branch prediction information exactly match the first branch instruction information. Specifically, the processor model 12 may determine whether the first branch instruction prediction address, the first branch prediction direction and the first branch prediction target address do not exactly match the first branch instruction address, the first branch direction and the first branch target address, respectively. In short, the processor model 12 may compare its branch prediction result related to the first branch instruction with a correct execution result of the first branch instruction provided by the JIT emulation engine 13 and determine whether to enforce the JIT emulation engine 13 to perform a speculation operation.

In an embodiment, if the first branch instruction prediction address, the first branch prediction direction and the first branch prediction target address exactly match the first branch instruction address, the first branch direction and the first branch target address, respectively, it means that a prediction of the processor model 12 is correct, so the execution model 11 can continue to control the JIT emulation engine 13 to fetch and execute the instruction subsequent to the first branch instruction. In this embodiment, the subsequent instruction can be understood as an instruction next to the first branch instruction in a normal instruction stream, but not limited thereto. For illustrative convenience, the execution model 11 at the time can be understood as being switched to a continued fetch state (hereinafter referred to as a first continued fetch state) in a normal operation path (i.e., a non-speculation operation path). In addition, in an embodiment, if the processor model 12 has correct predictions for each branch instruction in the first fetch unit, the execution model 11 may maintain the continued fetch state in the normal operation path until each instruction in the first fetch unit has been fetched and simulated. In this case, the execution model 11 may switch from the continued fetch state (i.e., the first continued fetch state) in the normal operation path to a wait fetch state in the normal operation path (hereinafter referred to as a first wait fetch state).

On the other hand, if the first branch instruction prediction address, the first branch prediction direction and the first branch prediction target address do not exactly match the first branch instruction address, the first branch direction and the first branch target address, respectively, it means that the prediction of the processor model 12 is incorrect. In this case, the invention may enforce the JIT emulation engine 13 to perform the speculation operation through the following mechanism to obtain information that can be used to model the speculation operation.

Specifically, in step S250, in response to determining that the first branch prediction information does not exactly match the first branch instruction information, the processor model 12 may send a first speculation start message to the execution model 11.

Then, in step S260, the execution model 11 may record a first processor status of the physical machine 14 in response to the first speculation start message and enforce the JIT emulation engine 13 to execute a first speculation operation according to the first branch prediction information.

It is worth noting that the invention is not limited by determining whether to perform the speculation operation only with approach in the foregoing steps S250 and S260. In another embodiment, it is also possible that the branch prediction information related to the first branch instruction and the correct execution result of the first branch instruction provided by the JIT emulation engine 13 are compared by the execution model 11. In this embodiment, the processor model 12 may send the first branch prediction information predicted by itself together with the first instruction fetch start message to the execution model 11 for comparison in step S210 described above. In this embodiment, the first speculation start message is not necessary. When determining that the first branch prediction information do not exactly match the first branch instruction information, the execution model 11 records the first processor status of the physical machine 14 and enforces the JIT emulation engine 13 to execute the first speculation operation according to the first branch prediction information.

As shown by FIG. 1, the execution model 11 may include the speculation stack 111, which is a first-in-last-out stack that can be used to record the first processor status of the physical machine 14. In an embodiment, the first processor status may be provided by the JIT emulation engine 13 and includes a first current register status and a first memory snapshot of a processor of the physical machine 14. In this case, the execution model 11 may add a first speculation unit associated with the first speculation operation in the speculation stack 111, wherein the first speculation unit records a first start speculation time of the first speculation operation, a first branch instruction address of the first branch instruction, the first current register status and the first memory snapshot. In short, the above operation can be understood as recording a current running scene of the processor of the physical machine 14 as the first speculation unit in advance before enforcing the JIT engine 13 to execute the first speculation operation. In this way, after the first speculation operation is ended, the execution model 11 may further restore the processor of the physical machine 14 to a state before the first speculation operation is executed based on the first speculation unit.

In certain embodiments, after executing the first speculation operation to enter the speculation operation path to execute the instruction stream on the speculation operation path, the processor model 12 may accordingly output a related simulated speculation execution result associated with the target processor. In other embodiments, after the specific application is ended, the processor model 12 may also output the related simulated speculation execution result (e.g., the number of executed instructions, the accuracy of branch prediction, the times of speculations and the like) for each speculation operation that occurs during execution as reference for relevant persons, but the invention is not limited to thereto. In some embodiments, the above-mentioned simulated speculation execution result may be collected by the processor model 12 based on state information such as the branch prediction tables/caches on each speculation operation path, and may be stored by the processor model 12 in the form of an archive. The invention not only obtains influence of the instructions on the processor architecture state (e.g., how registers and/or memories are modified) by the JIT emulation engine 13, but also the processor model 12 simulates the internal running way of the target processor to output the result related to the structure of the target processor (in particular, the simulated speculation execution result) so as to reflect influence of the speculative execution on an internal state of the target processor.

In addition, if another speculation operation (hereinafter referred to as a second speculation operation) occurs in the process of entering the speculation operation path to execute a first speculation instruction stream, the execution model 11 may also record the current running scene of the processor of the physical machine 14 as a second speculation unit before the second speculation operation is executed, and add the second speculation unit behind the first speculation unit. In this way, after the second speculation operation is ended, the execution model 11 may further restore the processor of the physical machine 14 to a state before the second speculation operation is executed based on the second speculation unit. Details regarding the above will be described later with reference to the drawings.

In an embodiment, after the first processor status is recorded, the execution model 11 may, for example, enforce the JIT emulation engine 13 to execute the first speculation operation according to the first branch instruction prediction address, the first branch prediction direction and the first branch prediction target address so as to enter the speculation operation path to execute the first speculation instruction stream. Specifically, after the speculation is started, if the first branch prediction direction is the branch not-taken, the execution model 12 may switch from the continued fetch state (i.e., the first continued fetch state) in the normal operation path to a wait fetch state (hereinafter referred to as a second continued fetch state) in the speculation operation path. That is to say, the execution model 11 may also determine to continue fetching. For illustrative convenience, the execution model 11 at the time can be understood as switching from the continued fetch state (i.e., the first continued fetch state) in the normal operation path to the continued fetch state (i.e., the second first continued fetch state) in the speculation operation path.

After the speculation is started, if the first branch prediction direction is the branch taken, the execution model 11 may further determine to stop fetching (i.e., cease fetching the next instruction from the first fetch unit), and send a first fetch end message to the processor model 12. In this case, the execution model 11 may switch from the continued fetch state (i.e., the first continued fetch state) in the normal operation path to a wait fetch state (hereinafter referred to as a second wait fetch state) in the speculation operation path. When the fetching is started on the speculation operation path, the execution model 11 may switch from the wait fetch state (i.e., the second wait fetch state) in the speculation operation path to the continued fetch state (i.e., the second continued fetch state) in the speculation operation path. When the fetching is ended, the execution model 11 again returns to the wait fetch state (i.e., the second wait fetch state) in the speculation operation path from the continued fetch state (i.e., the second continued fetch state) in the speculation operation path.

As described above, if a second branch instruction occurs during the process of entering the first speculation operation to execute the instruction stream, since the execution model 11 of the invention already enters a speculation state at the time, regardless of whether the speculation occurs on the second branch instruction, the execution model 11 has the same state jumpstate. Accordingly, it is only necessary to distinguish whether the second branch instruction is the branch taken or the branch not-taken. If the second branch instruction is the branch taken, the execution model 11 may switch from the continued fetch state (i.e., the second continued fetch state) in the speculation operation path to the wait fetch state (i.e., the second wait fetch state) in the speculation operation path. If the second branch instruction is the branch not-taken, the execution model 11 maintains at the continued fetch state (i.e., the second continued fetch state) in the speculation operation path. The specific implementation manner of nesting the second speculation operation in the first speculation operation will be described in detail later.

In an embodiment, after the processor model 12 requests the execution model 11 through the first speculation start message to enforce the JIT emulation engine 13 to execute the first speculation operation, the processor model 12 may determine whether to end the first speculation operation. For instance, the processor model 12 may determine whether the first branch instruction is completely executed in the simulation pipeline 121 on the processor model 12. If so, the processor model 12 may determine that the first speculation operation needs to be ended, and flush the simulation pipeline 121 to cancel influence of the first branch instruction on the processor model 12. As another example, if the processor model 12 knows that the speculation of the first branch instruction is incorrect when a decoding stage of its simulation pipeline 121 is completed (e.g., for an absolute jump instruction, whether the predicted jump is speculative or not may be known according to the branch target address obtained from decoding), the processor model 12 may then determine that the first speculation operation needs to be ended at that time.

In this case, in response to the processor model 12 determining that the first speculation operation needs to be ended, the processor model 12 may send a first speculation end message to the execution model 11 to control the execution model 11 to end the first speculation operation. Correspondingly, the execution model 11 may restore the physical machine 14 to the first processor status in response to the first speculation end message and control the JIT emulation engine 13 to obtain and execute an instruction subsequent to the first branch instruction.

In an embodiment, the first speculation end message from the processor model 12 may include the first start speculation time of the first speculation operation, and the first branch instruction address of the first branch instruction. Therefore, after the first speculation end message is received, according to the first start speculation time and the first branch instruction address, the execution model 11 may find the first speculation unit corresponding to the first speculation operation (which records the first current register status and the first memory snapshot of the physical machine 14 before the first speculation operation is started) in the speculation stack 111.

Then, the execution model 11 may restore a register status of the processor of the physical machine 14 according to the first current register status. Further, the execution model may further discard the first speculation unit and other speculation units (if any) sorted after the first speculation unit to cancel influence of the first speculation operation on the memory. In this way, the execution model 11 may restore the processor of the physical machine 14 to a state before the first speculation operation is executed and continue to operate on the correct instruction stream.

An embodiment in which the second speculation operation is nested in the first speculation operation is detailed below. Under the second continued fetch state, the execution model 11 may use the JIT emulation engine 13 to control the physical machine 14 to fetch and execute the second branch instruction. In this embodiment, the second branch instruction may be another branch instruction in the first fetch unit. In this case, the simulation system 10 of the invention may execute a similar operation after step S240 of FIG. 2 based on the second branch instruction, but not limited thereto. The second branch instruction may also be a branch instruction in another fetch unit (e.g., a second fetch unit). In this case, the simulation system 10 of the invention may execute a similar operation after step S210 of FIG. 2 based on the second branch instruction.

Specifically, as mentioned above, the processor model 12 may generate branch prediction information of each branch instruction in the first fetch unit in advance. If the second branch instruction and the first branch instruction both belong to the first fetch unit, the branch prediction information herein may also include branch prediction information related to the second branch instruction (hereinafter, referred to as second branch prediction information). Similar to the first branch prediction information, the second branch prediction information related to the second branch instruction may also include a second branch instruction prediction address, a second branch prediction direction and a second branch prediction target address.

In an embodiment, the execution model 11 may obtain a plurality of second branch instruction information of the second branch instruction from the JIT emulation engine 13 and provide the plurality of second branch instruction information to the processor model 12. Similar to the first branch instruction information related to the first branch instruction, the second branch instruction information may also include static instruction information and dynamic instruction information (e.g., operand values and the like). Here, the static instruction information may include a second branch instruction address, a second branch direction and a second branch target address which are associated with the second branch instruction.

In an embodiment, the second branch instruction address, the second branch direction and the second branch target address can be understood as a branch instruction address, a branch direction and a branch target address correctly obtained when the second branch instruction is fetched and executed. Upon comparison, the second branch instruction prediction address, the second branch prediction direction and the second branch prediction target address in the second branch prediction result can be understood as a prediction result obtained by the processor model 12 by simulating a branch predictor of the target processor.

In an embodiment, the processor model 12 may determine whether the second branch prediction information exactly match the second branch instruction information. Specifically, the processor model 12 may determine whether the second branch instruction prediction address, the second branch prediction direction and the second branch prediction target address exactly match the second branch instruction address, the second branch direction and the second branch target address, respectively. In brief, the processor model 12 may compare its branch prediction result related to the second branch instruction with correct execution information of the second branch instruction provided by the JIT emulation engine 13 and determine whether to enforce the JIT emulation engine 13 to execute another speculation operation (e.g., the second speculation operation mentioned above) in the first speculation operation.

In an embodiment, if the second branch instruction prediction address, the second branch prediction direction and the second branch prediction target address exactly match the second branch instruction address, the second branch direction and the second branch target address, respectively, it means that a prediction of the processor model 12 is correct, so the execution model 11 can continue to control the JIT emulation engine 13 to fetch and execute the instruction subsequent to the second instruction.

On the other hand, if the second branch instruction prediction address, the second branch prediction direction and the second branch prediction target address do not exactly match the second branch instruction address, the second branch direction and the second branch target address, respectively, it means that the prediction of the processor model 12 is incorrect. In this case, the invention may enforce the JIT emulation engine 13 to execute the second speculation operation through the following mechanism so as to obtain information that can be used to model the speculation operation.

Specifically, after determining that the plurality of second branch prediction information do not exactly match the plurality of second branch instruction information, the processor model 12 may send a second speculation start message to the execution model 11. Then, the execution model 11 may record a second processor status of the processor of the physical machine 14 in response to the second speculation start message and enforce the JIT emulation engine 13 to execute the second speculation operation according to the second branch prediction information.

In an embodiment, the second processor status may be provided by the JIT emulation engine 13 and may include a second current register status and a second memory snapshot of the processor of the physical machine 14. In this embodiment, the second speculation operation can be understood as another speculation operation additionally occurred during the first speculation operation. In this case, the first speculation unit corresponding to the first speculation operation should already be recorded in the speculation stack 111, Accordingly, the execution model 11 may add the second speculation unit associated with the second speculation operation in the speculation stack 111, wherein the second speculation unit records a second start speculation time of the second speculation operation, a second branch instruction address of the second branch instruction, the second current register status and the second memory snapshot. Further, in this embodiment, compared to the first memory snapshot, the second memory snapshot further records memory pages modified after the first speculation operation is executed.

In an embodiment, during the second speculation operation, the execution model 11 may switch between the continued fetch state (i.e., the second continued fetch state) in the speculation operation path and the wait fetch state (i.e., the second wait fetch state) in the speculation operation path based on actual situation, but not limited thereto. For instance, in the case where the execution model 11 is in the second continued fetch state, if the considered fetch unit is completed or the branch taken is encountered, the execution model 11 may switch to the second wait fetch state. As another example, in the case where the execution model 11 is in the second continued fetch state, if the execution model 11 receives a fetch start message from the processor model 12, the execution model 11 may then switch to the continued fetch state. However, the disclosure is not limited in this regard.

Then, in response to the processor model 12 determining that the second speculation operation needs to be ended (e.g., the second branch instruction is completely executed on the simulation pipeline 121 or the second branch instruction is completely decoded on the simulation pipeline 121), the processor model 12 may send a second speculation end message to the execution model 11 to control the execution model 11 to control the JIT emulation engine 13 to end the second speculation operation. In this embodiment, the operation herein can be understood as returning to the path of the first speculation operation from the path of the second speculation operation so as to continue executing the first speculation operation.

Similar to the first speculation end message, the second speculation end message may include a second start speculation time and a second instruction address corresponding to the second speculation operation for the execution model 11 to find the second speculation unit corresponding to the second speculation operation in the speculation stack 111 accordingly.

Then, the execution model 11 may restore the physical machine 14 to the second processor status in response to the second speculation end message and control the JIT emulation engine 13 to fetch and execute an instruction subsequent to the second instruction. In addition, since it is still in the process of the first speculation operation, the execution model 11 at that time can be understood as maintaining at the continued fetch state (i.e., the second continued fetch state) in the speculation operation path.

In an embodiment, the execution model 11 may find the second speculation unit corresponding to the second speculation operation from the speculation stack 111 according to the second start speculation time and the second instruction address, restore a register status of the processor of the physical machine 14 according to the second current register status recorded by the second speculation unit, and discard the second speculation unit and other speculation units sorted after the second speculation unit to cancel influence of the second speculation operation on the memory.

Figure 3:
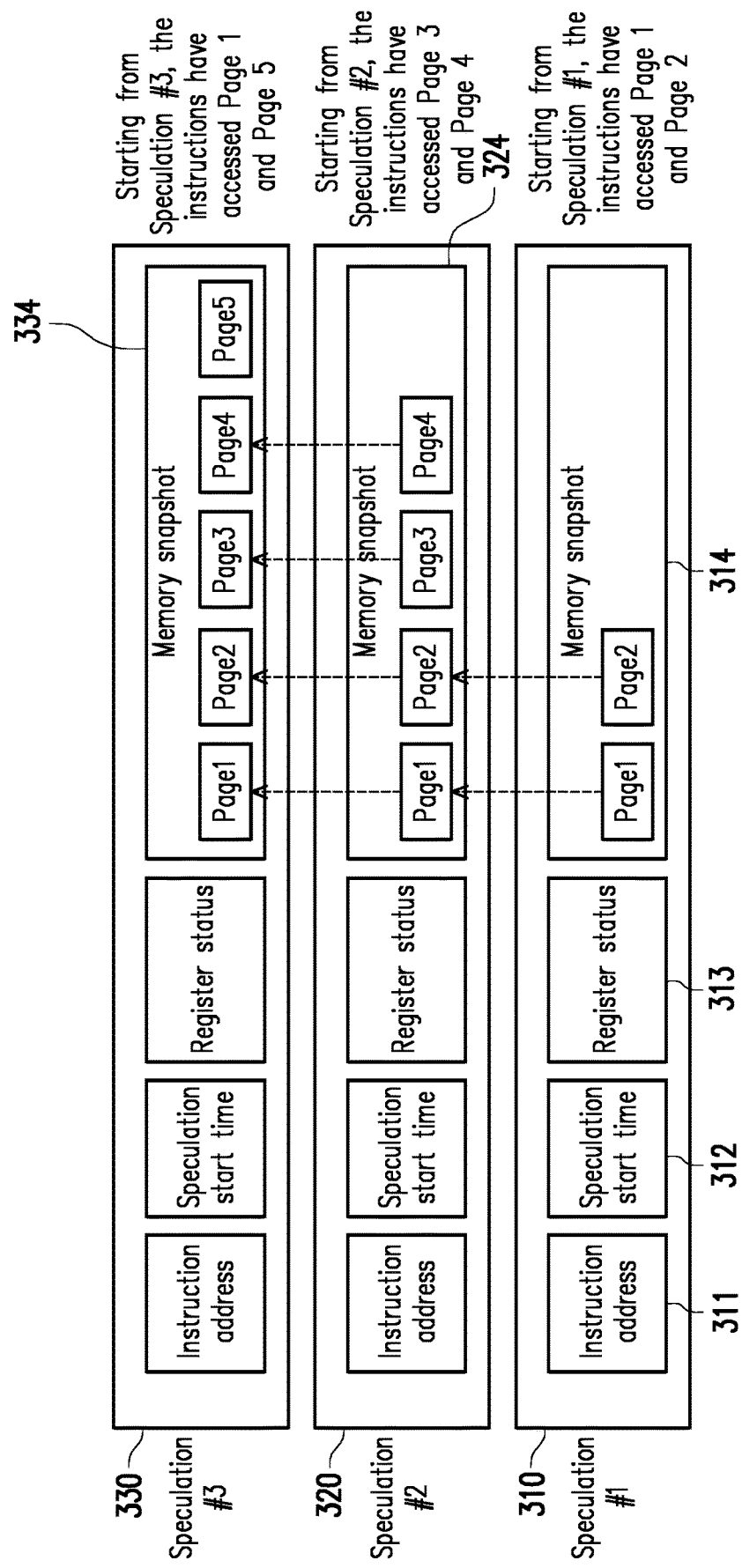
FIG. 3 is a schematic diagram of a speculation stack illustrated according to an embodiment of the invention.

Referring to FIG. 3, FIG. 3 is a schematic diagram of a speculation stack illustrated according to an embodiment of the invention. In this embodiment, the speculation stack 111 may record, for example, speculation units 310, 320 and 330 respectively corresponding to different speculation operations. For illustrative convenience, it is assumed that the speculation units 310 and 320 are the first and second speculation units cited in the foregoing embodiments. In addition, it is also assumed that the speculation unit 330 corresponds to a speculation operation (hereinafter referred to as a third speculation operation) additionally occurred during the second speculation operation entering the speculation operation path to execute the second speculation instruction stream, but not limited thereto. In other words, the first, second, and third speculation operations can be understood as corresponding to Speculation #1, Speculation #2 and Speculation #3 shown in FIG. 3, respectively, but the invention is not limited thereto.

Under the above assumptions, it can be seen that an instruction address 311, a speculation start time 312, a register status 313, and a memory snapshot 314 in the speculation unit 310 can respectively be understood as the first start speculation time of the first speculation operation, the first branch instruction address of the first branch instruction, the first current register status and the first memory snapshot, but the invention is no limited thereto. Based on the above, those skilled in the art should understand the meaning of each element in the speculation units 320 and 330 accordingly, which are not repeated hereinafter.

In this embodiment, before the execution model 11 enforces the JIT emulation engine 13 to execute the first speculation operation, the execution model 11 may record the first start speculation time of the first speculation operation, the first branch instruction address of the first branch instruction, the first current register status and the first memory snapshot as the speculation unit 310.

Roughly speaking, the speculation stack 111 is empty when a specific application is running on the normal instruction stream. In this case, it is not required to execute a memory access redirection but could directly access a processor memory of the physical machine 14. However, when the JIT emulation engine 13 is enforced to execute the speculation operation, what stored in the register status in a top-of-stack speculation unit (e.g., the speculation unit 330) of the speculation stack 111 is the register status at the time of this speculation (e.g., the third speculation operation) which cannot be modified. In the speculation operation, a register access is still executed on physical registers. However, the memory access redirection to the memory snapshot of the top-of-stack speculation unit for the processor memory of the physical machine 14 is required. In brief, the memory snapshot in the speculation unit can be understood as a current virtual memory.

In this case, the memory snapshot does not need to back up the entire physical memory, but only back up pages that have been modified since the first layer of speculation. If a page to be accessed is already stored in the memory snapshot, a memory access operation may directly read and write the memory snapshot. On the other hand, if the page to be accessed is not yet in the memory snapshot, the page is first added to the memory snapshot and copied from the physical memory to the memory snapshot, so then the memory snapshot may be read and written by the memory access operation.

In the embodiments of the invention, when the JIT emulation engine 13 is enforced to execute the first speculation operation, the execution model 11 may add one speculation unit 310 on the top of the speculation stack 111. If the second speculation operation is enforced to be executed again during the first speculation operation, the execution model 11 may add another speculation unit 320 on the top of the speculation stack 111.

In the scenario of FIG. 3, since the first speculation operation may be regarded as the first level speculation operation, the memory snapshot 314 can be initialized to be empty. Then, assuming that during the first speculation operation, Page 1 and Page 2 are accessed by the instructions, the execution model 11 may add Page 1 and Page 2 to the memory snapshot 314, and then read and write Page 1 and Page 2.

In an embodiment, before the JIT emulation engine 13 is enforced to execute the second speculation operation, the execution model 11 may add the speculation unit 320 on the top of the speculation stack 111 based on the above teaching. The execution model 11 may copy the memory snapshot 314 of the speculation unit 310 to the memory snapshot 324 of the speculation unit 320. Assuming that during the second speculation operation, Page 3 and Page 4 are accessed by the instructions, the execution model 11 may add Page 3 and Page 4 to the memory snapshot 324, and then read and write Page 3 and Page 4.

Similarly, in an embodiment, before the JIT emulation engine 13 is enforced to execute the third speculation operation, the execution model 11 may add the speculation unit 330 on the top of the speculation stack 111 based on the above teaching. The execution model 11 may copy the memory snapshot 324 of the speculation unit 320 to the memory snapshot 334 of the speculation unit 330. Assuming that during the third speculation operation, Page 1 and Page 5 are accessed by the instructions, the execution model 11 may add Page 5 to the memory snapshot 334, and then read and write Page 1 and Page 5.

In an embodiment, when the speculation operation is ended, the execution model 11 may retrieve one speculation unit in the stack according to the speculation end message provided by the processor model 12. Specifically, if the branch instruction address that causes the speculation and the start speculation time included in the speculation end message provided by the processor model 12 match the branch instruction address and the start speculation time of one specific speculation unit in the stack, that specific speculation unit is "a unit that ends the speculation". Then, the execution model 11 may restore the register status of the processor of the physical machine 14 to the register status stored in the unit that ends the speculation, thereby cancelling influence of the instructions executed in the speculation operation on the register. Also, the execution model 12 may discard the unit that ends the speculation and all the speculation units thereon. In this case, the speculation unit at the top of the stack is changed to a previous speculation unit of the unit that ends the speculation. In addition, because all the influence of the instructions executed in speculation operation on the memory occur on the memory snapshot, discarding the speculation unit is equivalent to discarding influence of the instructions executed in the speculation operation on the memory.

For example, assuming that the ended speculation operation is the second speculation operation, the execution model 11 may restore the register status according to the speculation unit 320, and discard the speculation unit 320 and the speculation unit 330 thereon, thereby discarding influence of the instructions executed in the second speculation operation on the memory. In this case, the speculation unit at the top of the stack is changed to the speculation unit 310, but the invention is not limited thereto.

In an embodiment, if the unit that ends the speculation is the first speculation unit in the speculation stack 111 (e.g., the speculation unit 310), the speculation stack 111 may be emptied. That is, influence of the instructions executed in the first, second, and third speculation operations on the memory will be discarded accordingly.

In certain embodiments, if the processor model 12 predicts a specific instruction but that specific instruction does not exist, this predicted branch instruction is called a fake branch instruction. In this case, the processor model 12 may mark a fake branch on the last instruction in the first fetch unit and send a speculation start message. Correspondingly, the execution model 11 may wait for a next fetch start message at the first branch prediction target address. In addition, in the speculation unit added in the speculation stack 11 by the execution model 11 in response to the fake branch instruction, the execution model 11 may record an address of the last instruction in the last fetch unit in the instruction address of that speculation unit, but the invention is not limited thereto.

In certain embodiments, during the first speculation operation, if the execution model 11 determines to continue fetching (i.e., the execution model 11 maintains at/enters the continued fetch state in the speculation operation path) according to the previously taught situation (e.g., the first branch prediction direction is the branch not-taken), the execution model 11 may check whether instruction information of each instruction in the first fetch unit is sent to the processor model 12. If so, it means that each instruction of the first fetch unit has been simulated, and related instruction information have been returned to the processor model 12. Thus, the execution model 11 may send the first fetch end message to the processor model 12, and switch from the continued fetch state (i.e., the second continued fetch state) in the speculation operation path to the wait fetch state (i.e., the second wait fetch state) in the speculation operation path to wait for the next fetch start message.

In certain embodiments, after the first speculation operation is ended, if the speculation stack 111 is empty, the execution model 11 may switch from the wait fetch state (i.e., the second wait fetch state) in the speculation operation path to the wait fetch state (i.e., the first wait fetch state) in the normal operation path.

Figure 4:
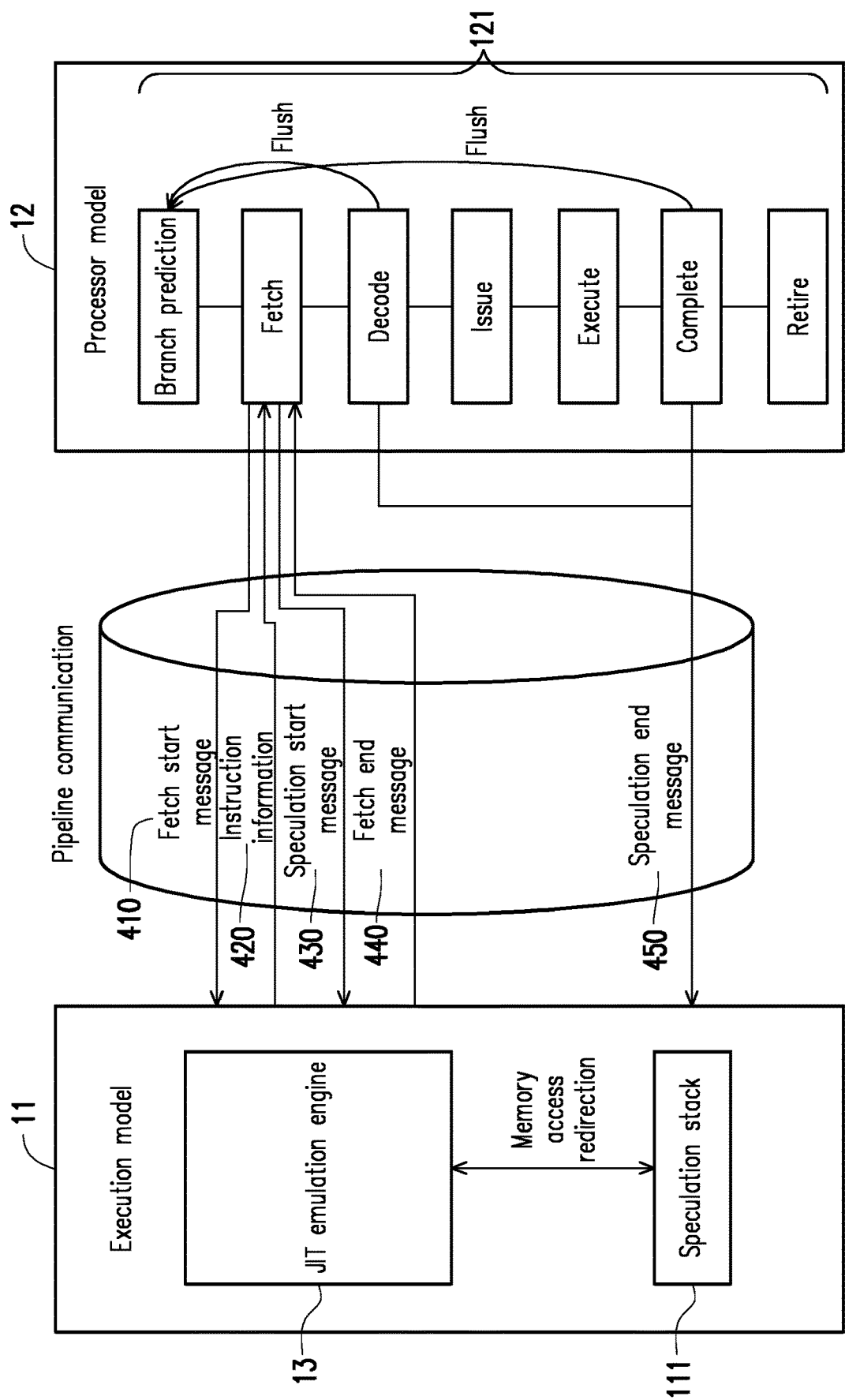
FIG. 4 is a schematic diagram of a simulation system interaction illustrated according to an embodiment of the invention.

Generally speaking, the operation of the simulation system 10 of the invention may be briefly illustrated as shown in FIG. 4. Referring to FIG. 4, FIG. 4 is a schematic diagram of a simulation system interaction illustrated according to an embodiment of the invention. As shown by FIG. 4, the processor model 12 may simulate the target processor to execute the branch prediction on each branch instruction in one fetch unit, generate respective branch prediction information, and then simulate a fetch behavior of the target processor. At the time, the processor model 12 may send a fetch start message 410 to the execution model 11. Then, the execution model 12 may return an instruction information 420 (e.g., the correct execution result) of each branch instruction to the processor model 12 for the processor model 12 to determine whether to request the execution model 11 to enforce the JIT emulation engine 13 to execute the speculation operation. In this embodiment, assuming that the prediction of the processor model 12 is incorrect, the processor model 12 may send a speculation start message 430 to the execution model 11. As described above, in other embodiments, whether to enforce the JIT emulation engine 13 to execute the speculation operation may also be determined by the execution model 11. In this embodiment, the speculation start message 430 is not necessary. Instead, the processor model 12 may send the branch prediction information predicted and generated by the processor model 12 itself together with the fetch start message 410 to the execution model 11 for comparison by the execution model 11, so as to determine whether to execute the speculation operation.

Then, when the execution model 11 determines to stop fetching (the fetch unit is completed; or the branch taken is encountered), the execution model 11 may send a fetch end message 440 to the processor model 12. Then, the processor model 12 may determine that the speculation operation needs to be ended at the decoding stage or a completion stage of the simulation pipeline 121 based on actual situation, accordingly send a speculation end message 450, and flush the simulation pipeline 121. For details regarding the same, reference may be made to the description in the foregoing embodiment, which is not repeated hereinafter.

Figure 5:
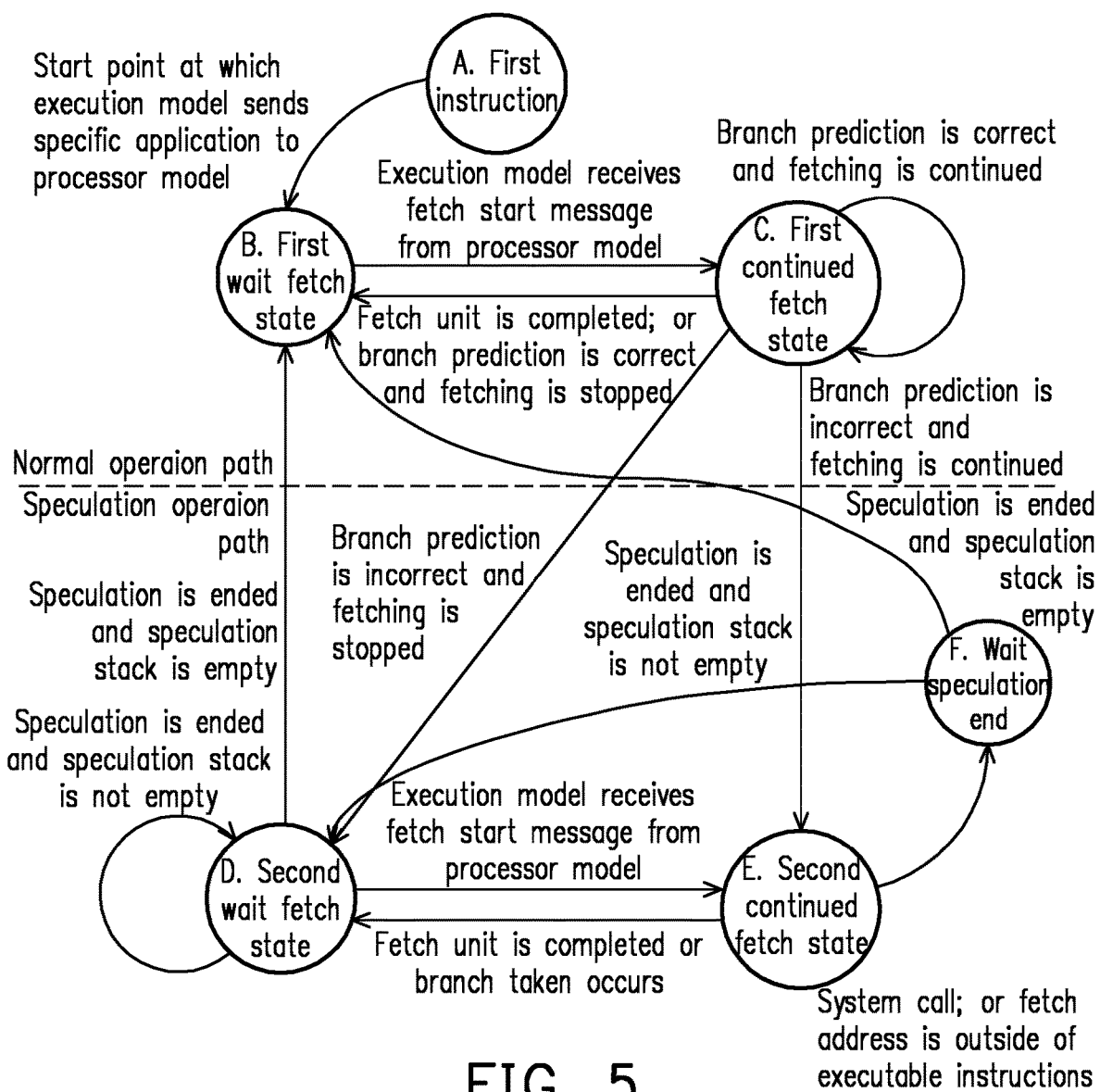
FIG. 5 is a schematic diagram of a state switching of the execution model illustrated according to an embodiment of the invention.

Referring to FIG. 5, FIG. 5 is a schematic diagram of a state switching of the execution model illustrated according to an embodiment of the invention. In this embodiment, a control state machine of the execution model 11 may include 6 states as shown in FIG. 5. Among them, State A, State B (i.e., the first wait fetch state) and State C (i.e., the first continued fetch state) appear on the normal operation path. On the other hand, State D (i.e., the second wait fetch state), State E (i.e., the second continued fetch state) and State F appear on the speculation operation path. The transition between the states may be achieved by a control procedure of the execution model 11. The control procedure is executed before each instruction is executed.

First of all, in an embodiment, when a specific application is activated, the execution model 11 may stay at State A by default to consider the first branch instruction of the specific application. In this case, the execution model 11 may send a start point of the specific application to the processor model 12 and then switch to State B. Then, the execution model 11 may switch between State B to State F based on actual situation.

Since the execution model 11 fetch and execute tasks in the simulation pipeline 121 for the processor model 12, in an embodiment, the control procedure on the execution model 11 may include two stages (i.e., the code is divided into two parts), which may be respectively understood as completing the fetching of a previous instruction and waiting for the fetching of the current instruction. In an embodiment, in the first stage of the control procedure, the execution model 11 may obtain an execution result of the previous instruction from the JIT emulation engine 13, which is then sent together with the static information of the previous instruction stored in the execution model 11 as the instruction information (e.g., the instruction information 420 of FIG. 4) to the processor model 12. In the second stage of the control procedure, the execution model 11 executes a state switching. If the previous instruction is a branch instruction, the execution model 11 stays at State C and wait for the processor model 12 to inform of whether to execute the speculation and whether to continue fetching the current fetch unit.

Specifically, the processor model 12 compares whether a branch direction and a branch target address provided by the JIT emulation engine 13 are consistent with a branch direction and a branch target address predicted by the processor model 12. If the result of the JIT emulation engine 13 is consistent with the branch prediction result (i.e., the branch prediction is correct), the processor model 12 does not start the speculation. Further, if the branch direction is the branch taken, the fetching is stopped (i.e., switching from State C to State B). Otherwise, if the branch direction is the branch not-taken, the fetching is continued (i.e., maintaining at State C).

On the other hand, if the result of the JIT emulation engine 13 is not inconsistent with the branch prediction result (i.e., the branch prediction is incorrect), the processor model 12 may start the speculation. In this case, if the prediction direction is the branch taken, the fetching is stopped (i.e., switching from State C to State D). Otherwise, if the branch direction is the branch not-taken, the fetching is continued (i.e., switching from State C to State E). In this embodiment, if the execution model 11 is already on the speculation operation path, regardless of whether the speculation occurs again or not, the execution model 11 will constantly stay on the speculation operation path until the processor model 12 sends the speculation end message 450. In addition, if the direction of a branch (i.e., the second branch instruction) encountered again on the speculation path is the branch taken, the execution model 11 may stop fetching (i.e., switching from State E to State D).

After sending the instruction information of the previous instruction to the processor model 12, the execution model 11 further checks related instruction information of each instruction in the currently considered fetch unit has been passed to the processor model 12. If the fetch unit has unit has been completely passed, the execution model 11 may enter the second wait fetch state (e.g., switching from State C to State B, or switching from State E to State D). In general, the fetch end message 440 of FIG. 4 may be sent when the execution model 11 switches from State C to State B, or from State C to State D, or from State E to State D, and may include two situations: the fetching of the current fetch unit is ended or the fetching is ended due to the branch taken.

In the second stage of the control procedure, if the control state machine enters the wait fetch state (States B and D), the procedure will stay at the second stage to wait for the message from the processor model 12. If the processor model 12 passes the fetch start message, the continued fetch state will be re-entered (e.g., switching from State B to State C or switching from State D to State E).

In an embodiment, if the processor model 12 passes the speculation end message 450 and the execution model 11 has emptied the speculation stack 111, the execution model 11 may return to the first wait fetch state on the normal operation path (i.e., switching from State D to State B). If the processor model 12 passes the speculation end message 450 but the execution model 11 has not yet emptied the speculation stack 111 (i.e., there are still speculation instructions not completely executed on the simulation pipeline 121), the execution model 11 may stay at the second wait fetch state (i.e., State D).

In addition, because the JIT emulation engine 13 cannot track sub procedure that requires a privilege mode such as a system call, influence of the system call on the system cannot be cancelled. Therefore, if the system call is encountered on the speculation operation path, the execution model 11 should block the instruction execution until the processor model 12 informs the execution model 11 that the speculation is ended (i.e., switching from State E to State F, and then switching from State F to State B or State D).

In addition, the instruction in the speculation operation may exceed a scope of executable instructions. If the instruction is enforced outside the scope of the executable instructions, an incorrect instruction encoding may be encountered, causing the JIT emulation engine 13 to crash. Therefore, if a situation where the instruction is outside the scope of the executable instructions is encountered on the speculation operation path, the execution model 11 should also block the instruction execution until the processor model 12 informs the execution model 11 that the speculation is ended (i.e., switching from State E to State F, and then switching from State F to State B or State D).

Figure 6:
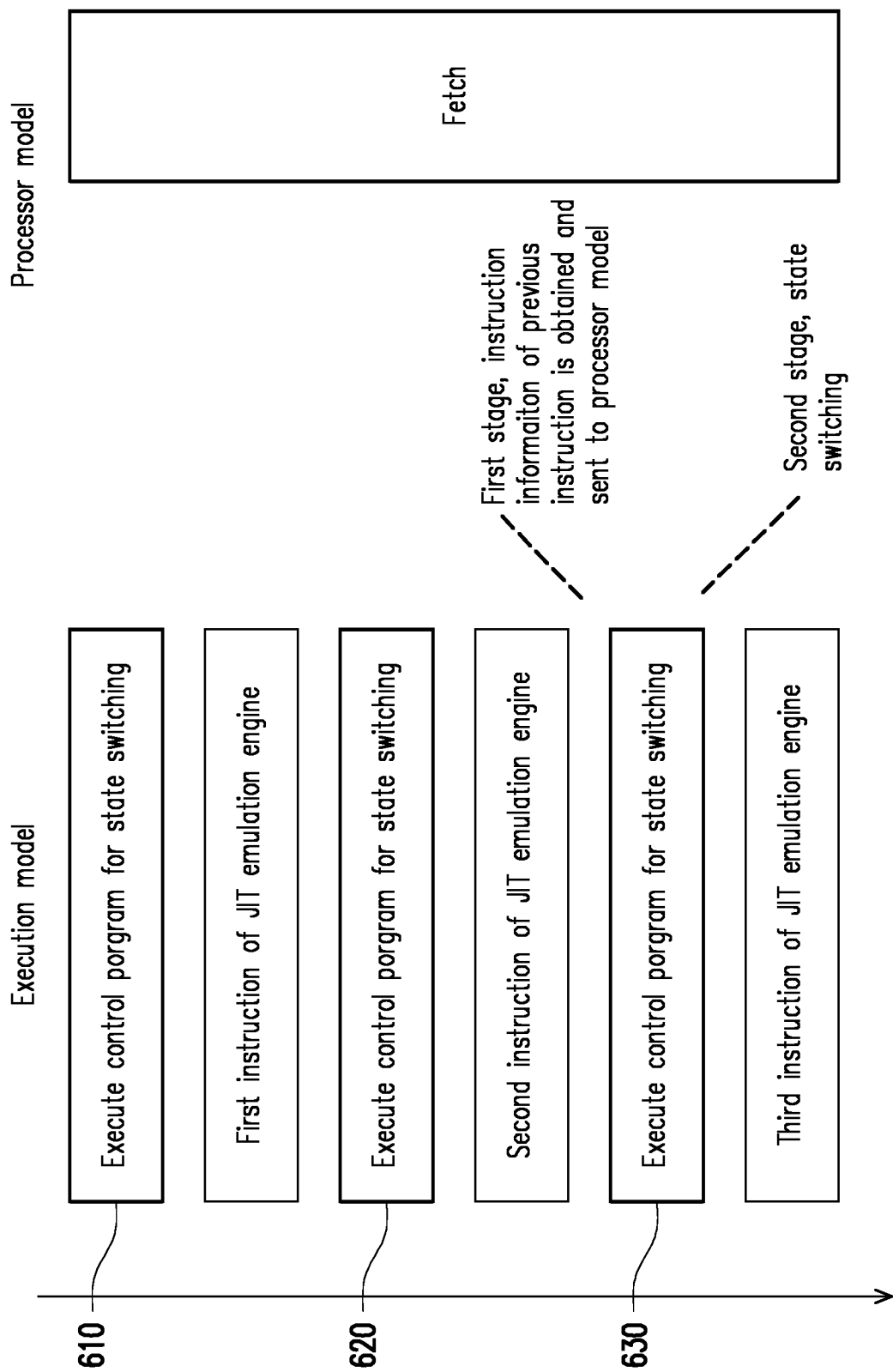
FIG. 6 is a timing diagram of a state switching of the execution model illustrated according to FIG. 5.

Referring to FIG. 6, FIG. 6 is a timing diagram of a state switching of the execution model illustrated according to FIG. 5. In this embodiment, when the execution model 11 executes the timing diagram, correspondingly, the processor model 12 is simulating and executing "fetch" of a fetch unit, but the invention is not limited thereto.

As can be seen from FIG. 6 that when the first instruction of the specific application is considered at a time point 610, the execution model 11 may execute the control procedure of the state switching of FIG. 5 to switch from State A to State B. Then, the execution model 11 may switch again from State B to State C to continue fetching. Then, the execution model 11 may control the JIT emulation engine 13 to execute the first instruction (i.e., the JIT emulation engine 13 controls the physical machine 14 to execute the first instruction).

When the second instruction of the specific application is considered at a time point 620, the execution model 11 may execute the control procedure in the following manner. First, the instruction information 420 of the first instruction is obtained in the first stage of the control procedure and transmitted to the processor model 12; then, the state switching is executed in the second stage of the control procedure. For instance, it is assumed that the first instruction is the last instruction of one fetch unit or the first instruction is the branch taken, the execution model 11 switches from State C to State B at the time point 620, and switches from State B to State C again if a next fetch start message is received. For instance, it is assumed that the first instruction is not the last instruction of one fetch unit and is the branch not-taken, the execution model 11 continues to stay at State C. Next, the execution model 11 may control the JIT emulation engine 13 to execute the second instruction.

When the third instruction of the specific application is considered at a time point 630, the execution model 11 may execute the control procedure in the following manner. First, the instruction information 420 of the second instruction is obtained in the first stage of the control procedure and transmitted to the processor model 12; then, the state switching is executed in the second stage of the control procedure. For instance, it is assumed that the second instruction is the branch instruction, the branch prediction is incorrect (i.e., the speculation operation is started) and there is the branch not-taken, the execution model 11 switches from State C to State E at the time point 630; then, the execution model 111 maintains at State E (or can be understood as switching from State E to the same State E). Next, the execution model 11 may control the JIT emulation engine 13 to execute the third instruction.

In summary, the invention provides a simulation method and a simulation system, which can be implemented with a JIT-based emulation engine. The simulation system of the invention can be divided into an execution model and a processor model based on JIT emulation engine. Here, the execution model can call the JIT emulation engine to execute instructions, and obtain influence of the instructions on an architectural status of a processor. In addition, the processor model can simulate an internal process of a target processor and determine whether to start and end a speculation. The execution model and the processor model can interact through a specific protocol. After the speculation is started, the simulation method of the invention may store an application running scene when the speculation is started, and redirect influence of speculation instructions on a memory to a memory snapshot. After the speculation is ended, the simulation method of the invention may also restore the application running scene to a status before the speculation is started, and cancel influence of the speculation instructions on the memory. Through the method proposed by the invention, the JIT emulation engine can also accurately model and simulate the speculation execution. In this way, related processor hardware designers can optimize the record of speculation occurred in the processor architecture and influence of the speculative execution on the processor performance based on the relevant results of the speculation execution.

In addition, the simulation method and the simulation system provided by the invention can also help related software designers to optimize the performance of the software. Specifically, in the case where a processor vendor sells a processor A to a customer who develops software, this processor vendor may provide the simulation system of the invention (including the execution model and the processor model that simulates the behavior of the processor A) as an accessory like a software development kit (SDK or other similar form) to the customer. By doing so, the customer may further optimize the developed software based on the simulated speculation results provided by the processor model after running the developed software with the JIT emulation engine.

Lastly, it should be noted that, each of the above embodiments merely serves as an example in the invention instead of limitation thereto. Despite that the invention has been described with reference to above embodiments, it will be apparent to those skilled in the art that various modifications and variations can be made to the structure of the technical content disclosed in above embodiments of the invention without departing from the scope or spirit of the invention. In view of the foregoing, it is intended that the invention cover modifications and variations of this invention provided they fall within the scope of the following claims and their equivalents.

What is claimed is:
1. A simulation method adapted to a simulation system comprising an execution model and a processor model, the simulation method comprising:
   simulating a target processor by the processor model to generate a plurality of first branch prediction information associated with a first branch instruction;

receiving a first fetch start message from the processor model by the execution model, wherein the first fetch start message comprises a first fetch address;

calling a real-time emulation engine by the execution model to control a physical machine to fetch and execute the first branch instruction according to the first fetch address;

obtaining a plurality of first branch instruction information of the first branch instruction from the real-time emulation engine and providing the plurality of first branch instruction information to the processor model by the execution model; and in response to determining that the plurality of first branch prediction information do not exactly match the plurality of first branch instruction information, recording a first processor status of the physical machine and enforcing the real-time emulation engine to execute a first speculation operation according to the plurality of first branch prediction information by the execution model.

2. The simulation method according to claim 1, further comprising: in response to the processor model determining that the first speculation operation needs to be ended, sending a first speculation end message to the execution model by the processor model to control the execution model to end the first speculation operation; and restoring the physical machine to the first processor status in response to the first speculation end message and controlling the real-time emulation engine to fetch and execute an instruction subsequent to the first branch instruction by the execution model.

3. The simulation method according to claim 2, further comprising:

determining, by the processor model, whether the first branch instruction is completely executed in a simulation pipeline on the processor model; and in response to determining that the first branch instruction is completely executed in the simulation pipeline on the processor model, determining that the first speculation operation needs to be ended and flushing the simulation pipeline by the processor model.

4. The simulation method according to claim 1, wherein in response to determining that the plurality of first branch prediction information do not exactly match the plurality of first branch instruction information, the step of recording the first processor status of the physical machine and enforcing the real-time emulation engine to execute the first speculation operation according to the plurality of first branch prediction information by the execution model further comprises:

in response to determining that the plurality of first branch prediction information do not exactly match the plurality of first branch instruction information, sending a first speculation start message to the execution model by the processor model; and recording the first processor status of the physical machine in response to the first speculation start message and enforcing the real-time emulation engine to execute the first speculation operation according to the plurality of first branch prediction information by the execution model.

5. The simulation method according to claim 1, further comprising:

fetching a first fetch unit according to the first fetch address by the processor model, wherein the first fetch unit comprises a plurality of instructions, which include the first branch instruction; and simulating the target processor by the processor model to generate a plurality of branch prediction information respectively associated with the plurality of instructions.

6. The simulation method according to claim 1, further comprising:

in response to determining that the plurality of first branch prediction information exactly match the plurality of first branch instruction information, controlling the real-time emulation engine by the execution model to fetch and execute an instruction subsequent to the first branch instruction.

7. The simulation method according to claim 1, wherein the execution model comprises a speculation stack, the first processor status is provided by the real-time emulation engine and comprises a first current register status and a first memory snapshot of a processor of the physical machine, and the step of recording the first processor status of the physical machine by the execution model comprises:

adding a first speculation unit associated with the first speculation operation in the speculation stack by the execution model, wherein the first speculation unit records a first start speculation time of the first speculation operation, a first branch instruction address of the first branch instruction, the first current register status and the first memory snapshot.

8. The simulation method according to claim 7, further comprising:

sending the first speculation end message to the execution model by the processor model to control the execution model to end the first speculation operation, wherein the first speculation end message comprises the first start speculation time and the first branch instruction address;

finding the first speculation unit corresponding to the first speculation operation from the speculation stack according to the first start speculation time and the first branch instruction address by the execution model;

restoring a register status of the processor according to the first current register status by the execution model; and discarding the first speculation unit and other speculation units sorted after the first speculation unit by the execution model.

9. The simulation method according to claim 1, wherein the plurality of first branch prediction information comprise a first branch instruction prediction address, a first branch prediction direction and a first branch prediction target address, and the plurality of first branch instruction information comprise a first branch instruction address, a first branch direction and a first branch target address.

10. The simulation method according to claim 9, wherein in response to determining that the first branch instruction prediction address, the first branch prediction direction and the first branch prediction target address do not exactly match the first branch instruction address, the first branch direction and the first branch target address, respectively, determining that the plurality of first branch prediction information do not exactly match the plurality of first branch instruction information by the processor model.

11. The simulation method according to claim 9, wherein the step of enforcing the real-time emulation engine to execute the first speculation operation according to the plurality of first branch prediction information comprises:

enforcing the real-time emulation engine by the execution model to jump to the first branch prediction target address according to the first branch instruction prediction address;

in response to the first branch direction being a branch taken, determining to stop fetching, and sending a first fetch end message to the processor model by the execution model; and in response to the first branch direction being a branch not-taken, determining to continue fetching by the execution model.

12. The simulation method according to claim 9, further comprising:

further calling the real-time emulation engine by the execution model to control the physical machine to fetch and execute a second branch instruction according to a second fetch address;

obtaining a plurality of second branch instruction information of the second branch instruction from the real-time emulation engine and providing the plurality of second branch instruction information to the processor model by the execution model;

in response to determining that a plurality of second branch prediction information do not exactly match the plurality of second branch instruction information, recording a second processor status of the physical machine and enforcing the real-time emulation engine to execute a second speculation operation according to the plurality of second branch prediction information by the execution model;

in response to the processor model determining that the second speculation operation needs to be ended, sending a second speculation end message to the execution model by the processor model to control the execution model to end the second speculation operation; and restoring the physical machine to the second processor status in response to the second speculation end message and controlling the real-time emulation engine to fetch and execute an instruction subsequent to the second branch instruction by the execution model.

13. The simulation method according to claim 12, wherein the execution model comprises a speculation stack, the speculation stack records a first speculation unit associated with the first speculation operation, the first speculation unit records a first start speculation time of the first speculation operation, a first branch instruction address of the first branch instruction, a first current register status and a first memory snapshot, the second processor status is provided by the real-time emulation engine and comprises a second current register status and a second memory snapshot of a processor of the physical machine, and the step of recording the second processor status of the physical machine by the execution model comprises:

adding a second speculation unit associated with the second speculation operation in the speculation stack by the execution model, wherein the second speculation unit records a second start speculation time of the second speculation operation, a second branch instruction address of the second branch instruction, the second current register status and the second memory snapshot, wherein, compared to the first memory snapshot, the second memory snapshot further records memory pages modified after the first speculation operation is executed.

14. The simulation method according to claim 13, wherein the second speculation end message comprises the second start speculation time and the second branch instruction address, and the step of restoring the physical machine to the second processor status in response to the second speculation end message by the execution model comprises:

finding the second speculation unit corresponding to the second speculation operation from the speculation stack according to the second start speculation time and the second instruction address by the execution model;

restoring a register status of the processor according to the second current register status and discarding the second speculation unit and other speculation units sorted after the second speculation unit by the execution model.

15. The simulation method according to claim 9, wherein in response to the first branch instruction being a fake branch instruction, the simulation method further comprises:

sending instruction information of each instruction in a first fetch unit corresponding to the first fetch address to the processor model by the execution model;

marking a fake bunch on a last instruction in the first fetch unit and sending a speculation start message by the processor model; and waiting for a next fetch start message at the first branch prediction target address by the execution model.

16. The simulation method according to claim 1, further comprising:

checking whether instruction information of all instructions in a first fetch unit corresponding to the first fetch address is sent to the processor model by the execution model; and in response to determining that the instruction information of all instructions in the first fetch unit corresponding to the first fetch address is sent to the processor model, sending a first fetch end message to the processor model and waiting for a next fetch start message by the execution model.

17. The simulation method according to claim 1, further comprising:

outputting a simulated speculation execution result associated with the target processor based on the first speculation operation by the processor model.

18. A simulation system, comprising:

a non-transitory memory, storing a processor model and an execution model; and a hardware processor, coupled to the non-transitory memory and performs:

simulating, by executing the processor model, a target processor to generate a plurality of first branch prediction information associated with a first branch instruction;

receiving, by executing the processor model, a first fetch start message from the processor model, wherein the first fetch start message comprises a first fetch address;

calling, by executing the processor model, a real-time emulation engine to control a physical machine to fetch and execute the first branch instruction according to the first fetch address;

obtaining, by executing the processor model, a plurality of first branch instruction information of the first branch instruction from the real-time emulation engine and providing, by executing the processor model, the plurality of first branch instruction information to the processor model; and in response to determining that the plurality of first branch prediction information do not exactly match the plurality of first branch instruction information, recording, by executing the processor model, a first processor status of the physical machine and enforcing, by executing the processor model, the real-time emulation engine to execute a first speculation operation according to the plurality of first branch prediction information.

19. The simulation system according to claim 18, wherein
in response to the hardware processor determining that the first speculation operation needs to be ended, the hardware processor executes the processor model to send a first speculation end message to end the first speculation operation; and the hardware processor executes the execution model to restore the physical machine to the first processor status in response to the first speculation end message and controls the real-time emulation engine to fetch and execute an instruction subsequent to the first branch instruction.

20. The simulation system according to claim 19, wherein the hardware processor executes the processor model to
determine whether the first branch instruction is completely executed in a simulation pipeline; and in response to determining that the first branch instruction is completely executed in the simulation pipeline, the hardware processor executes the processor model to determine that the first speculation operation needs to be ended and flushes the simulation pipeline.

21. The simulation system according to claim 18, wherein
in response to determining that the plurality of first branch prediction information do not exactly match the plurality of first branch instruction information, the hardware processor executes the processor model to send a first speculation start message; and the hardware processor executes the execution model to record the first processor status of the physical machine in response to the first speculation start message and enforce the real-time emulation engine to execute the first speculation operation according to the plurality of first branch prediction information.

22. The simulation system according to claim 18, wherein
the hardware processor executes the processor model to fetch a first fetch unit according to the first fetch address, wherein the first fetch unit comprises a plurality of instructions, which include the first branch instruction; and the hardware processor executes the processor model to simulate the target processor to generate a plurality of branch prediction results respectively associated with the plurality of instructions.

23. The simulation system according to claim 18, wherein
in response to determining that the plurality of first branch prediction information exactly match the plurality of first branch instruction information, the hardware processor executes the execution model to control the real-time emulation engine to fetch and execute an instruction subsequent to the first branch instruction.

24. The simulation system according to claim 18, wherein the first processor status is provided by the real-time emulation engine and comprises a first current register status and a first memory snapshot of a processor of the physical machine, wherein the hardware processor executes the execution model to add a first speculation unit associated with the first speculation operation in a speculation stack corresponding to the execution model, wherein the first speculation unit records a first start speculation time of the first speculation operation, a first branch instruction address of the first branch instruction, the first current register status and the first memory snapshot.

25. The simulation system according to claim 24, wherein the hardware processor executes the processor model to send the first speculation end message to end the first speculation operation, the first speculation end message comprises the first start speculation time and the first branch instruction address, wherein the hardware processor executes the execution model to find the first speculation unit corresponding to the first speculation operation from the speculation stack according to the first start speculation time and the first branch instruction address;

the hardware processor executes the execution model to restore a register status of the processor according to the first current register status; and the hardware processor executes the execution model to discard the first speculation unit and other speculation units sorted after the first speculation unit.

26. The simulation system according to claim 18, wherein the plurality of first branch prediction information comprise a first branch instruction prediction address, a first branch prediction direction and a first branch prediction target address, and the plurality of first branch instruction information comprise a first branch instruction address, a first branch direction and a first branch target address.

27. The simulation system according to claim 26, wherein
in response to determining that the first branch instruction prediction address, the first branch prediction direction and the first branch prediction target address do not exactly match the first branch instruction address, the first branch direction and the first branch target address, respectively, the hardware processor executes the processor model to determine that the plurality of first branch prediction information do not exactly match the plurality of first branch instruction information.

28. The simulation system according to claim 26, wherein
the hardware processor executes the execution model to enforce the real-time emulation engine to jump to the first branch prediction target address according to the first branch instruction prediction address;

in response to the first branch direction being a branch taken, the hardware processor executes the execution model to determine to stop fetching, and send a first fetch end message; and in response to the first branch direction being a branch not-taken, the hardware processor executes the execution model to determine to continue fetching.

29. The simulation system according to claim 18, wherein
the hardware processor executes the execution model to check whether instruction information of all instructions in a first fetch unit corresponding to the first fetch address is sent; and in response to determining that the instruction information of all instructions in the first fetch unit corresponding to the first fetch address is sent, the hardware processor executes the execution model to send a first fetch end message and wait for a next fetch start message.

30. The simulation system according to claim 18, wherein the hardware processor executes the processor model to output a simulated speculation execution result associated with the target processor based on the first speculation operation.

* * * * *